(12) United States Patent
Staal et al.

(10) Patent No.: US 12,358,273 B2
(45) Date of Patent: Jul. 15, 2025

(54) METHODS OF MAKING A REINFORCEMENT PART AND REINFORCING A VEHICLE

(71) Applicant: The Boeing Company, Arlington, VA (US)

(72) Inventors: Remmelt Andrew Staal, Irvine, CA (US); Jay J. Patel, Irvine, CA (US); John F. Spalding, Renton, WA (US)

(73) Assignee: The Boeing Company, Arlington, VA (US)

( * ) Notice: Subject to any disclaimer, the term of this patent is extended or adjusted under 35 U.S.C. 154(b) by 16 days.

(21) Appl. No.: 18/455,532

(22) Filed: Aug. 24, 2023

(65) Prior Publication Data

US 2025/0065616 A1   Feb. 27, 2025

(51) Int. Cl.
| | |
|---|---|
| *B32B 37/26* | (2006.01) |
| *B32B 37/10* | (2006.01) |
| *B64F 5/10* | (2017.01) |

(52) U.S. Cl.
CPC .......... *B32B 37/26* (2013.01); *B32B 37/1018* (2013.01); *B64F 5/10* (2017.01);
(Continued)

(58) Field of Classification Search
CPC ..... B29C 70/443; B29C 70/885; B29C 73/10; B64F 5/10; B32B 15/14; B32B 2037/268;
(Continued)

(56) References Cited

U.S. PATENT DOCUMENTS 11,400,657 B2   8/2022   Stall et al.

FOREIGN PATENT DOCUMENTS

| CN | 119502399 A | * | 2/2025 | ........... B29C 70/443 |
| EP | 1321283 A1 | | 6/2003 | |

(Continued)

OTHER PUBLICATIONS

Black, S., Fiber-metal laminates in the spotlight, Composites Word, Jul. 12, 2017, accessed from https://www.compositesworld.com/articles/fiber-metal-laminates-in-the-spotlight on Aug. 28, 2023.

(Continued)

*Primary Examiner* — Sonya M Sengupta
(74) *Attorney, Agent, or Firm* — Kunzler Bean & Adamson

(57) ABSTRACT

A method of making a reinforcement part for a vehicle includes applying a release film directly onto a surface of the vehicle, applying a first metallic layer directly or indirectly onto the release film, applying a curable bonding layer directly onto the first metallic layer, and applying a second metallic layer directly onto the curable bonding layer. The method also includes applying pressure to the first metallic layer, the curable bonding layer, and the second metallic layer so that the first metallic layer, the curable bonding layer, and the second metallic layer are compressed against the surface. The method further includes curing the curable bonding layer when pressure is applied to the curable bonding layer to form the reinforcement part. The method additionally includes, after curing the curable bonding layer, removing the reinforcement part from the surface.

22 Claims, 10 Drawing Sheets

(52) U.S. Cl.
CPC ... *B32B 2037/268* (2013.01); *B32B 2305/076* (2013.01); *B32B 2311/00* (2013.01); *B32B 2605/18* (2013.01)

(58) Field of Classification Search
CPC ........... B32B 2305/076; B32B 2311/00; B32B 2605/18; B32B 37/1018; B32B 37/26
See application file for complete search history.

(56) References Cited

FOREIGN PATENT DOCUMENTS

| | | | | |
|---|---|---|---|---|
| EP | 2873620 | A1 | 5/2015 | |
| EP | 4169702 | A1 | 4/2023 | |
| EP | 4512604 | A1 * | 2/2025 | ........... B29C 70/443 |
| WO | 2012154544 | A2 | 11/2012 | |

OTHER PUBLICATIONS

Extended European Search Report for EP Application No. 24190361.6 dated Jan. 16, 2025.

\* cited by examiner

METHODS OF MAKING A REINFORCEMENT PART AND REINFORCING A VEHICLE

FIELD

This disclosure relates generally to reinforcing a surface of a vehicle, and more particularly to making a reinforcement part for reinforcing vehicle surface by using the vehicle surface to form the reinforcement part.

BACKGROUND

Vehicles, such as aircraft, may require reinforcement after use of the vehicle in the field. In some instances, the surface of a vehicle can experience damage or fatigue, which may manifest as cracking along the surface. Also, some surfaces have features, such as areas around holes, that may require reinforcement over time.

To help strengthen a surface experiencing damage or fatigue, a patch can be applied to the surface. The patch helps to absorb microcrack energy, which promotes a stagnation of the existing damage or fatigue and prolongs the life of the vehicle.

Some conventional patches are formed from a metallic sheet. The metallic sheet is shaped by any of various shaping tools, such as an English Wheel, at a location away from the surface and then attached onto the surface. Often, shaping the metallic sheet requires many iterations of shaping and fitting on the surface until the fit is right. Shaping the metallic sheet to fit the shape of the surface, using such conventional trial-and-error methods, is difficult and time consuming.

SUMMARY

The subject matter of the present application has been developed in response to the present state of the art, and in particular, in response to the shortcomings of conventional surface reinforcement techniques, that have not yet been fully solved by currently available techniques. Accordingly, the subject matter of the present application has been developed to provide a method of making a reinforcement part and reinforcing a surface using the reinforcement part that overcome at least some of the above-discussed shortcomings of prior art techniques.

The following is a non-exhaustive list of examples, which may or may not be claimed, of the subject matter, disclosed herein.

Disclosed herein is a method of making a reinforcement part for a vehicle. The method includes applying a release film directly onto a surface of the vehicle so that the release film conforms to a shape of the surface. The method also includes applying a first metallic layer directly or indirectly onto the release film so that the first metallic layer conforms to the shape of the surface. The method further includes applying a curable bonding layer directly onto the first metallic layer so that the curable bonding layer conforms to the shape of the surface. The method additionally includes applying a second metallic layer directly onto the curable bonding layer so that the curable bonding layer is interposed between the first metallic layer and the second metallic layer, and so that the second metallic layer conforms to the shape of the surface. The method also includes applying pressure to the first metallic layer, the curable bonding layer, and the second metallic layer so that the first metallic layer, the curable bonding layer, and the second metallic layer are compressed against the surface. The method further includes curing the curable bonding layer when pressure is applied to the curable bonding layer to form the reinforcement part. The method additionally includes, after curing the curable bonding layer, removing the reinforcement part from the surface. The preceding subject matter of this paragraph characterizes example 1 of the present disclosure.

The curable bonding layer includes a fiber-reinforced polymeric layer. The preceding subject matter of this paragraph characterizes example 2 of the present disclosure, wherein example 2 also includes the subject matter according to example 1, above.

The fiber-reinforced polymeric layer includes a prepreg material, and curing the curable bonding layer includes heating the prepreg material. The preceding subject matter of this paragraph characterizes example 3 of the present disclosure, wherein example 3 also includes the subject matter according to example 2, above.

Heating the prepreg material includes applying a heating blanket over the first metallic layer, the fiber-reinforced polymeric layer, and the second metallic layer and activating the heating blanket. The preceding subject matter of this paragraph characterizes example 4 of the present disclosure, wherein example 4 also includes the subject matter according to example 3, above.

The curable bonding layer includes a dry fiber sheet infused with liquid resin. Applying the curable bonding layer includes applying the dry fiber sheet directly onto the first metallic layer and infusing liquid resin into the dry fiber sheet when the dry fiber sheet is applied onto the first metallic layer. The preceding subject matter of this paragraph characterizes example 5 of the present disclosure, wherein example 5 also includes the subject matter according to any of examples 2-4, above.

The liquid resin is cured at room temperature. The preceding subject matter of this paragraph characterizes example 6 of the present disclosure, wherein example 6 also includes the subject matter according to example 5, above.

The method further includes curing the fiber-reinforced polymer layer at a temperature greater than room temperature after the reinforcement part is removed from the surface. The preceding subject matter of this paragraph characterizes example 7 of the present disclosure, wherein example 7 also includes the subject matter according to example 6, above.

Infusing the liquid resin into the dry fiber sheet includes applying a vacuum bag over the first metallic layer, the fiber-reinforced polymeric layer, and the second metallic layer, sealing the vacuum bag to the surface so that the first metallic layer, the fiber-reinforced polymeric layer, and the second metallic layer are sealed within a cavity defined between the vacuum bag and the surface, and reducing the pressure within the cavity. The preceding subject matter of this paragraph characterizes example 8 of the present disclosure, wherein example 8 also includes the subject matter according to any of examples 5-7, above.

Curing the curable bonding layer includes applying a heating blanket over the vacuum bag, the first metallic layer, the fiber-reinforced polymeric layer, and the second metallic layer. Applying pressure to the first metallic layer, the fiber-reinforced polymeric layer, and the second metallic layer includes applying a second vacuum bag over the heating blanket, the vacuum bag, the first metallic layer, the fiber-reinforced polymeric layer, and the second metallic layer, sealing the second vacuum bag to the surface so that the heating blanket, the vacuum bag, the first metallic layer, the fiber-reinforced polymeric layer, and the second metallic layer are sealed within a second cavity defined between the second vacuum bag and the surface, and reducing the pressure within the second cavity. The preceding subject matter of this paragraph characterizes example 9 of the present disclosure, wherein example 9 also includes the subject matter according to example 8, above.

Applying pressure to the first metallic layer, the curable bonding layer, and the second metallic layer includes applying a vacuum bag over the first metallic layer, the curable bonding layer, and the second metallic layer, sealing the vacuum bag to the surface so that the first metallic layer, the curable bonding layer, and the second metallic layer are sealed within a cavity defined between the vacuum bag and the surface, and reducing the pressure within the cavity. The preceding subject matter of this paragraph characterizes example 10 of the present disclosure, wherein example 10 also includes the subject matter according to any of examples 1-9, above.

The curable bonding layer consists of a non-fibrous adhesive layer. The preceding subject matter of this paragraph characterizes example 11 of the present disclosure, wherein example 11 also includes the subject matter according to any of examples 1-10, above.

The curable bonding layer includes a first non-fibrous adhesive layer, a second non-fibrous adhesive layer, and a fiber-reinforced polymeric layer interposed between the first non-fibrous adhesive layer and the second non-fibrous adhesive layer. The preceding subject matter of this paragraph characterizes example 12 of the present disclosure, wherein example 12 also includes the subject matter according to any of examples 1-11, above.

Each one of the first metallic layer and the second metallic layer has a thickness between, and inclusive of, 0.01 inches and 0.04 inches. The preceding subject matter of this paragraph characterizes example 13 of the present disclosure, wherein example 13 also includes the subject matter according to any of examples 1-12, above.

The shape of the surface, to which the release film, the first metallic layer, the fiber-reinforced polymeric layer, and the second metallic layer is conformed, is non-planar. The preceding subject matter of this paragraph characterizes example 14 of the present disclosure, wherein example 14 also includes the subject matter according to any of examples 1-13, above.

The vehicle is an aircraft, and the surface is an exterior surface of a skin of the aircraft. The preceding subject matter of this paragraph characterizes example 15 of the present disclosure, wherein example 15 also includes the subject matter according to any of examples 1-14, above.

One of the first metallic layer is applied directly onto the release film, or the method further includes applying a second curable bonding layer directly onto the release film so that the second curable bonding layer conforms to the shape of the surface, and the first metallic layer is applied directly onto the second curable bonding layer. The preceding subject matter of this paragraph characterizes example 16 of the present disclosure, wherein example 16 also includes the subject matter according to any of examples 1-15, above.

Further disclosed herein is a method of reinforcing a vehicle. The method includes applying a release film directly onto a surface of the vehicle so that the release film conforms to a shape of the surface. The method also includes applying a first metallic layer directly or indirectly onto the release film so that the first metallic layer conforms to the shape of the surface. The method further includes applying a curable bonding layer directly onto the first metallic layer so that the curable bonding layer conforms to the shape of the surface. The method additionally includes applying a second metallic layer directly onto the curable bonding layer so that the curable bonding layer is interposed between the first metallic layer and the second metallic layer, and so that the second metallic layer conforms to the shape of the surface. The method also includes applying pressure to the first metallic layer, the curable bonding layer, and the second metallic layer so that the first metallic layer, the curable bonding layer, and the second metallic layer are compressed against the surface. The method further includes curing the curable bonding layer when pressure is applied to the curable bonding layer to form a reinforcement part comprising the first metallic layer, the curable bonding layer, and the second metallic layer. The method additionally includes after curing the curable bonding layer, removing the reinforcement part from the surface and removing the release film from the surface. The method also includes after removing the reinforcement part and the release film from the surface, attaching the reinforcement part to the surface. The preceding subject matter of this paragraph characterizes example 17 of the present disclosure.

The release film is applied directly onto a first portion of the surface over damage to or adjacent a feature of the first portion of the surface. The first metallic layer, the curable bonding layer, and the second metallic layer conform to the shape of the first portion of the surface. The reinforcement part is attached to the first portion of the surface over the damage to or adjacent the feature of the first portion of the surface. The preceding subject matter of this paragraph characterizes example 18 of the present disclosure, wherein example 18 also includes the subject matter according to example 17, above.

The release film is applied directly onto a first portion of the surface, the first metallic layer, the curable bonding layer, and the second metallic layer conform to the shape of the first portion of the surface. The reinforcement part is attached to a second portion of the surface over damage to or adjacent a feature of a second portion of the surface that is spaced from the first portion of the surface, and the first portion of the surface has a contour that matches a contour of the second portion of the surface. The preceding subject matter of this paragraph characterizes example 19 of the present disclosure, wherein example 19 also includes the subject matter according to any of examples 17-18, above.

Attaching the reinforcement part to the surface includes bonding the reinforcement part to the surface. The preceding subject matter of this paragraph characterizes example 20 of the present disclosure, wherein example 20 also includes the subject matter according to any of examples 17-19, above.

Attaching the reinforcement part to the surface further includes bolting the reinforcement part to the surface. The preceding subject matter of this paragraph characterizes example 21 of the present disclosure, wherein example 21 also includes the subject matter according to example 20, above.

Attaching the reinforcement part to the surface includes bolting the reinforcement part to the surface. The preceding subject matter of this paragraph characterizes example 22 of the present disclosure, wherein example 22 also includes the subject matter according to any of examples 17-21, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The present disclosure includes multiple examples that overcome the shortcomings of conventional methods of reinforcing a surface of a vehicle by using the surface of the vehicle as a tooling or molding surface to form a reinforcement part that is separately attached to the surface. In this manner, the matching of the contour of the reinforcement part and the surface of the vehicle is ensured without the need for auxiliary shaping tools, such as English Wheels or molds, and the associated trial-and-error shaping methods. The reinforcement part can be formed using the damaged surface (or the surface in need of reinforcement) onto which the reinforcement part is to be attached. Alternatively, the reinforcement part can be formed using an un-damaged surface that has a contour that matches that of the damaged surface. By using the surface of the vehicle as a tooling surface, reinforcement parts can be made in a timely and efficient manner without the need for separate tooling and post-forming heat treatment.

Figure 1:
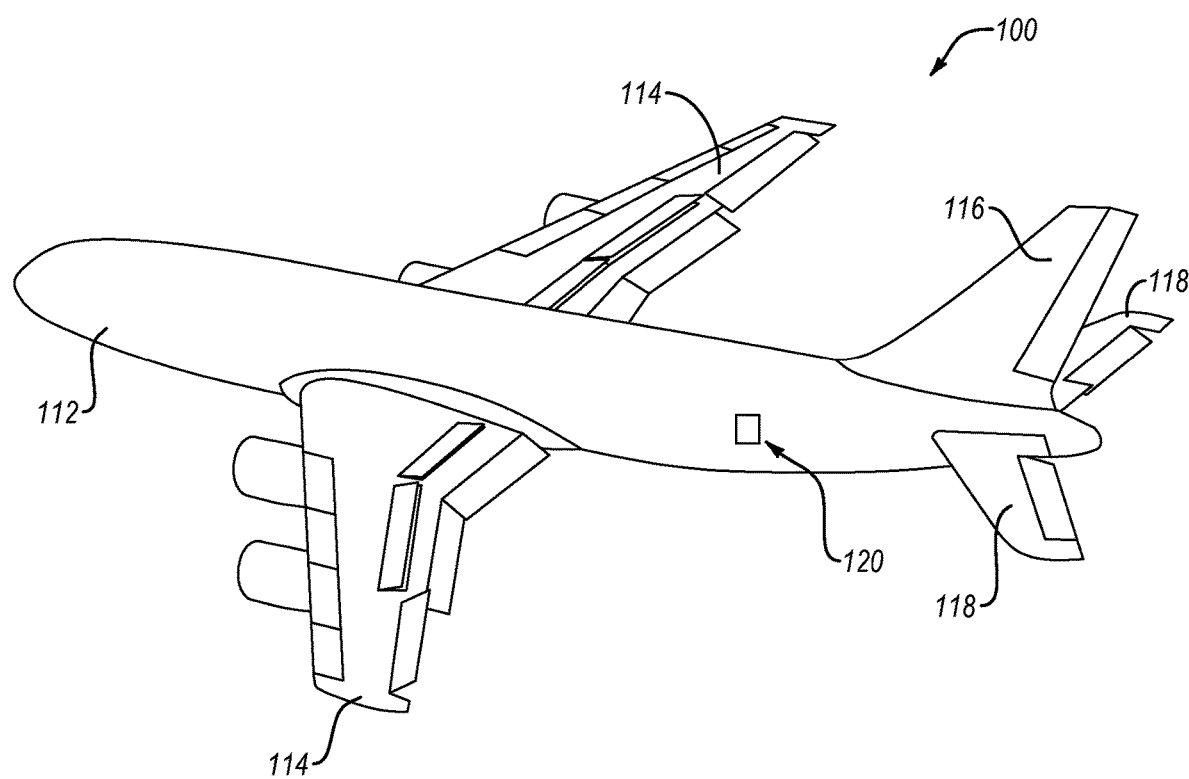
FIG. 1 is a perspective view of an aircraft, according to one or more examples of the present disclosure.

Referring to FIG. 1, one example of a vehicle is shown. The vehicle illustrated in FIG. 1 is an aircraft 100, which is representative of any of various types of aircraft, such as commercial aircraft used for the transportation of passengers, military aircraft for military operations, personal aircraft, fighter jets, and the like. Moreover, although an aircraft is depicted in the illustrated examples, in other examples, other types of vehicles can be used (e.g., helicopter, boat, spacecraft, automobile, etc.).

The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116. As depicted, the aircraft 100 represents a passenger airplane. Any of various parts, such as part 130 (see, e.g., FIG. 2), of the aircraft 100 include a surface that may be damaged or otherwise require reinforcement. As used herein, reinforcement mean repair or strengthening. Accordingly, a reinforcement part can mean a repair part or a strengthening part and a reinforcing method can mean a repair or strengthening method. In one example, the part 130 is the body 112 of the aircraft 100 and a surface 132 of the part 130 (see, e.g., FIG. 2) is an outer skin of the body 112. Accordingly, in some examples, the surface 132 of the part 130 is an exterior surface of the vehicle. For example, the surface 132 of the part 130 can be an exterior surface or skin of the wings 114, the vertical stabilizer 116, and/or the horizontal stabilizers 118.

The surface 132 of the part 130 can be made from any of various materials, such as a metallic material (e.g., aluminum alloy or steel alloy), or a composite material, such as a carbon-fiber or glass-fiber reinforced polymeric material. The part 130 can have a laminated construction. Moreover, the part 130 has a thickness defined as a distance between the surface 132 and an opposite surface of the part 130.

Figure 2:
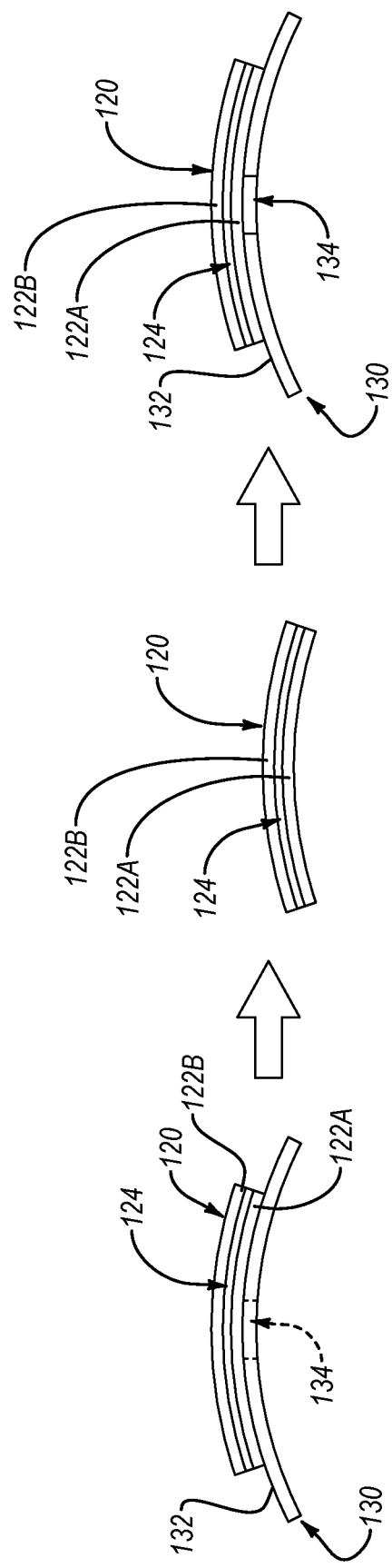
FIG. 2 is a flow diagram depicting multiple steps of a method of reinforcing a surface of a vehicle, using schematic cross-sectional representations of the vehicle and reinforcement part, according to one or more examples of the present disclosure.

Referring to FIGS. 1 and 2, the present disclosure presents methods of making a reinforcement part 120, using the surface 132 of the part 130 of the vehicle as a tooling surface, and subsequently attaching the reinforcement part 120 to the surface 132 of the vehicle. As shown in FIG. 2, in one example, the reinforcement part 120 is formed on the surface 132 of the part 130. In some examples, the reinforcement part 120 is formed over damage 134 in the surface 132 of the part 130, removed from the surface 132, and then attached back onto the surface 132 over the damage 134. However, in alternative examples, the reinforcement part 120 is formed on a portion of the surface 132 of the part 130 that does not have the damage 134, removed from that portion of the surface 132, and then attached onto the portion of the surface 132 that has the damage 134. The attachment of the reinforcement part 120 to the surface 132 is performed separately and by a different process than the formation of the reinforcement part 120 on the surface 132.

The reinforcement part 120 formed on the surface 132 has, at least, a first metallic layer 122A, a second metallic layer 122B, and a curable bonding layer 124 that is interposed between the first metallic layer 122A and the second metallic layer 122B. The curable bonding layer 124 bonds the first metallic layer 122A and the second metallic layer 122B together to create a laminated structure. The laminated construction of the reinforcement part 120 helps to reduce fatigue, by absorbing and distributing microcrack energy. Additionally, the potential for corrosion is reduced by the isolation provided by the interleaved bonding layers, which limit corrosion to the outermost layers of the reinforcement part 120.

Figure 3A:
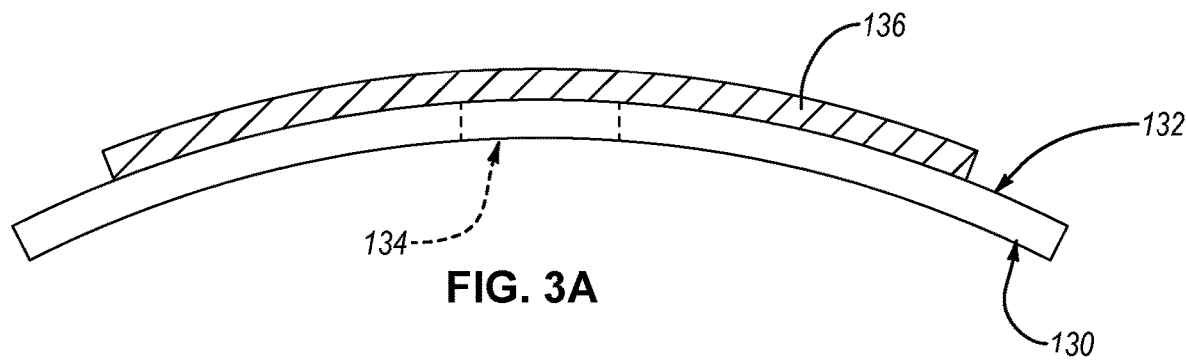
FIGS. 3A-3G are cross-sectional side views schematically illustrating respective steps of a method of making a reinforcement part, according to one or more examples of the present disclosure.
Figure 10:
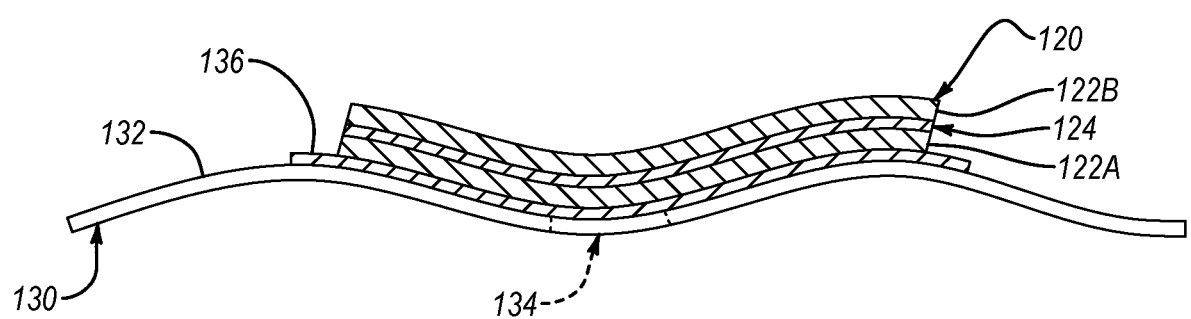
FIG. 10 is a cross-sectional side view of a reinforcement part formed on a surface of a vehicle having multiple contours, according to one or more examples of the present disclosure.
Figure 15:
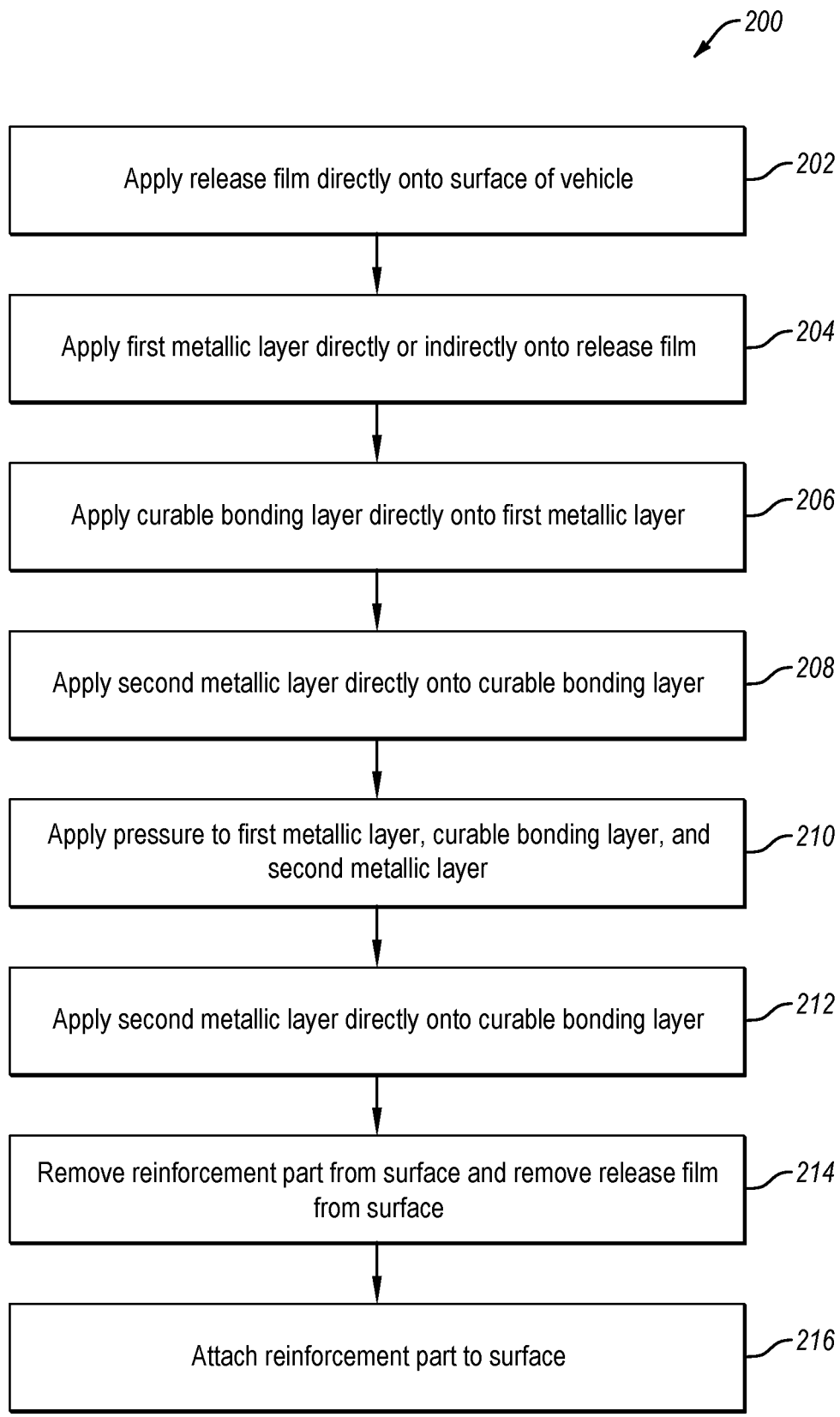
FIG. 15 is a schematic flow chart of a method of making a reinforcement part and reinforcing a vehicle, according to one or more examples of the present disclosure.

Referring to FIG. 15, a method 200 of making a reinforcement part and reinforcing a surface of a vehicle is shown. The method 200 includes (block 202) applying a release film 136 directly onto the surface 132 of the vehicle (e.g., the part 130 of the aircraft 100) so that the release film 136 conforms to a shape of the surface 132. As shown in FIG. 3A, the release film 136 is applied directly onto the surface 132 of the part 130 and takes the same shape as the surface 132. In the illustrated example the shape of the surface 132, and thus the release film 136 is a convex shape, but could be any of various non-planar shapes, such as a concave shape or a complex contoured shape with multiple inflection points (see, e.g., FIG. 10) for example. However, in other examples, the surface 132 can have a planar shape without departing from the essence of the present disclosure. The release film 136 can be any of various non-stick release films or liners configured to reduce adhesion or sticking between two parts, such as for example, siliconized films, polyester films, Teflon sheets, polytetrafluoroethylene (PTFE) sheets, and the like. Moreover, the release film 136 is deformable or flexible, which enables the release film 136 to take the same shape as the surface 132.

The release film 136 is directly applied onto the surface 132 over damage 134 (e.g., cracking) in the surface 132 in some examples. In these examples, the damage 134, if passing entirely through the thickness of the part 130, may need to be plugged to enable negative pressure generation, as described in more detail below. However, in other examples, the release film 136 is directly applied onto the surface 132 adjacent to the damage 134, so that the release film 136 is not applied over the damage 134. In these other examples, the damage 134 need not be plugged, even if passing entirely through the thickness of the part 130.

Figure 3B:
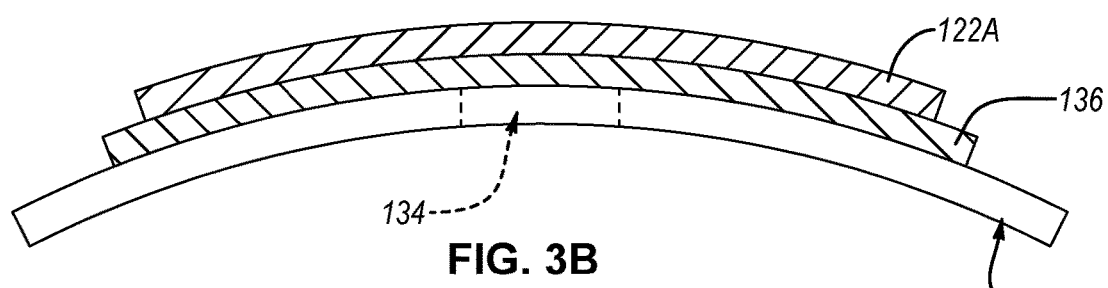

The method 200 also includes (block 204) applying the first metallic layer 122A directly or indirectly onto the release film 136 so that the first metallic layer 122A conforms to the shape of the surface 132. As used herein, directly applying a given layer onto another object means no other layer is interposed between the given layer and the object. In contrast, indirectly applying a given layer onto another object means another layer can be interposed between the given layer and the object. Referring to FIG. 3B, in some examples, the first metallic layer 122A is applied directly onto the release film 136 and takes the same shape as the release film 136, thus taking the same shape as the surface 132. The coverage of the release film 136 over the surface 132 is at least as large as the coverage of the first metallic layer 122A over the release film 136 to ensure the release film 136 is interposed between an entirety of the first metallic layer 122A and the surface 132. The first metallic layer 122A is deformable or flexible, which enables the first metallic layer 122A to take the same shape as the surface 132. The relatively small thickness of the first metallic layer 122A enables the deformability of the first metallic layer 122A. In some examples, the first metallic layer 122A has a thickness that is between, and inclusive of, 0.01 inches and 0.04 inches. In one example, the first metallic layer 122A is made of an aluminum alloy or a titanium alloy and has a thickness between, and inclusive of, 0.01 inches and 0.03 inches (e.g., 0.02 inches).

Figure 3C:
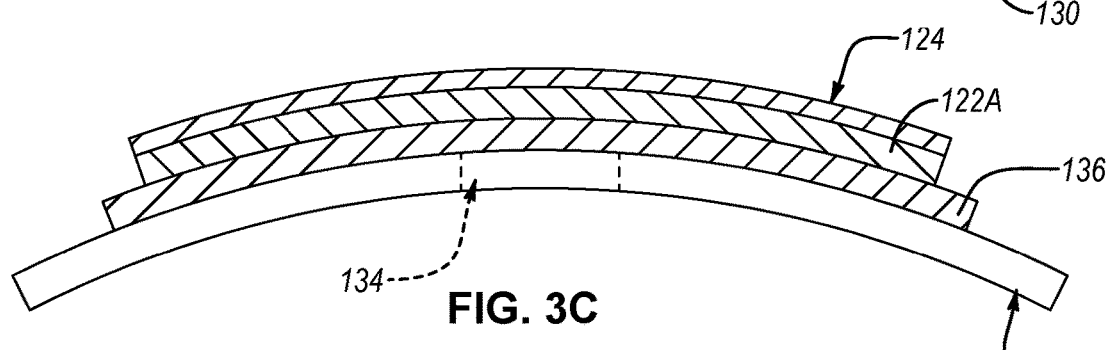
Figure 6:
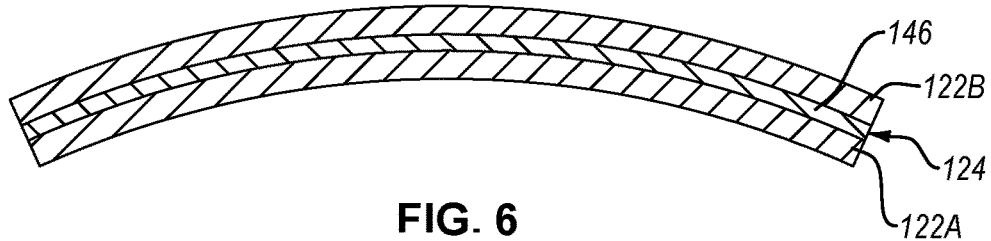
FIG. 6 is a cross-sectional side view of a reinforcement part, according to one or more examples of the present disclosure.
Figure 7:
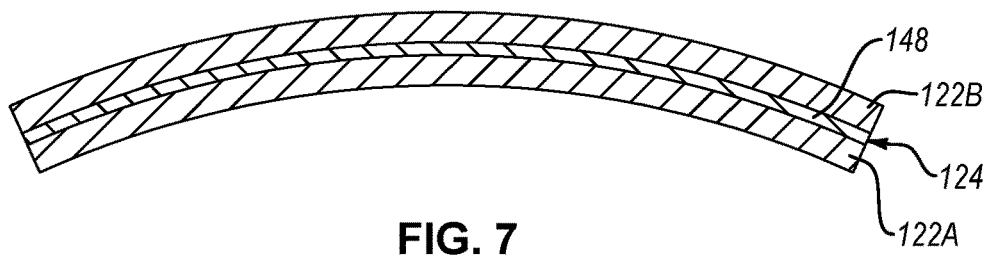
FIG. 7 is a cross-sectional side view of a reinforcement part, according to one or more examples of the present disclosure.

The method 200 also includes (block 206) applying the curable bonding layer 124 directly onto the first metallic layer 122A so that the curable bonding layer 124 conforms to the shape of the surface 132. Referring to FIG. 3C, in some examples, the curable bonding layer 124 is applied directly onto the first metallic layer 122A and takes the same shape as the first metallic layer 122A, thus taking the same shape as the surface 132. The curable bonding layer 124, prior to curing, is deformable or flexible, which enables the curable bonding layer 124 to take the same shape as the surface 132. In some examples, the thickness of the curable bonding layer 124 is less than the thickness of the first metallic layer 122A. In one example, the curable bonding layer 124 is made of a curable bonding material, such as an adhesive, a resin, an epoxy, and the like. The curable bonding material can be curable at any of various temperatures, such as room temperature (e.g., between 68° F. and 76° F.), or an elevated temperature above room temperature. As explained in more detail below, the curable bonding layer 124 is a non-fibrous adhesive layer 146 in some examples (see, e.g., FIG. 6), a fiber-reinforced polymeric layer 148 in other examples (see, e.g., FIG. 7), or a combination of non-fibrous adhesive layers 146 and a fiber-reinforced polymeric layer 148 (see, e.g., FIG. 8).

When the curable bonding layer 124 is or consists of the non-fibrous adhesive layer 146, the non-fibrous adhesive layer 146 can be applied onto the first metallic layer 122A using any of various application techniques. When applied, the material of the non-fibrous adhesive layer 146 can be in a glutinous or flowable state and applied by dispensing the non-fibrous adhesive layer 146 onto the first metallic layer 122A. In other examples, the non-fibrous adhesive layer 146 can be a solid, non-flowable, sheet that is placed onto the first metallic layer 122A.

Figure 8:
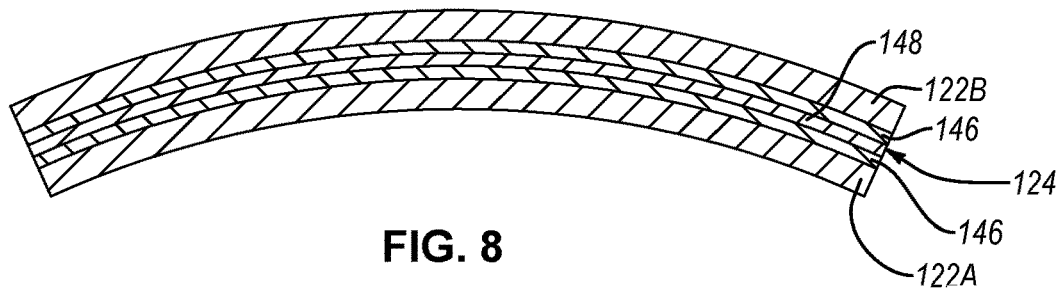
FIG. 8 is a cross-sectional side view of a reinforcement part, according to one or more examples of the present disclosure.

When the curable bonding layer 124 is a fiber-reinforced polymeric layer 148 made of prepreg material, the prepreg material, which can be a sheet of prepreg material, is placed or laid up onto the first metallic layer 122A. The prepreg material can be a fiberglass prepreg or carbon-fiber prepreg. Referring to FIG. 8, when the curable bonding layer 124 has a laminate construction made of a combination of non-fibrous adhesive layers 146 and a fiber-reinforced polymeric layer 148, the curable bonding layer 124 is applied onto the first metallic layer 122A by applying a non-fibrous adhesive layer 146 (e.g., a first non-fibrous adhesive layer) onto the first metallic layer 122A, applying a fiber-reinforced polymeric layer 148 onto the non-fibrous adhesive layer 146, and applying a non-fibrous adhesive layer 146 (e.g., a second non-fibrous adhesive layer) onto the fiber-reinforced polymeric layer 148. In certain examples, when the fiber-reinforced polymeric layer 148 is formed using a dry fiber sheet 154 infused with liquid resin (as described below), the curable bonding layer 124 can have a laminate construction made of the dry fiber sheet 154, infused with resin (i.e., the resin-infused dry fiber sheet) interposed or sandwiched between two non-fibrous adhesive layers 146.

Figure 3D:
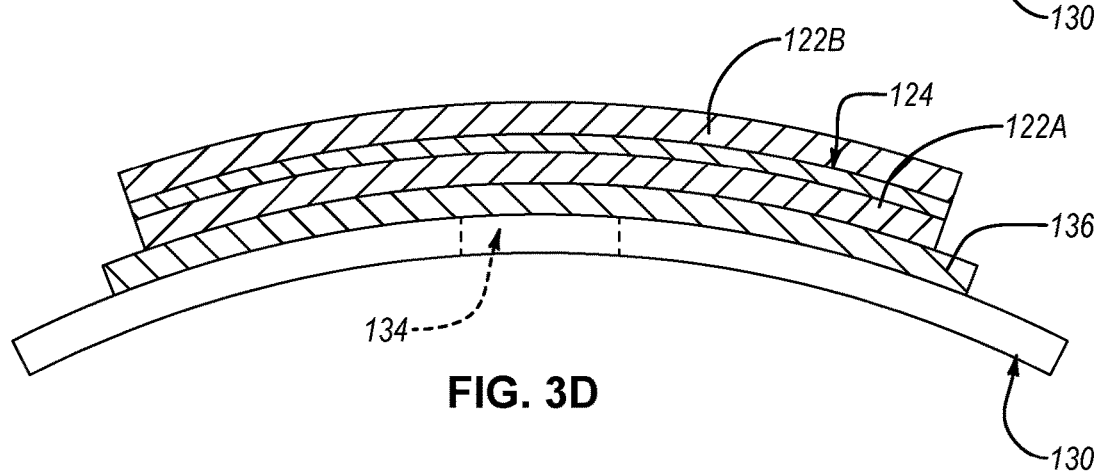

The method 200 further includes (block 208) applying the second metallic layer 122B directly onto the curable bonding layer 124 so that the second metallic layer 122B conforms to the shape of the surface 132. Referring to FIG. 3D, in some examples, the second metallic layer 122B is applied directly onto the curable bonding layer 124 and takes the same shape as the curable bonding layer 124, thus taking the same shape as the surface 132. In some examples, the second metallic layer 122B is configured and is made of the same material as the first metallic layer 122A. Accordingly, the second metallic layer 122B is deformable or flexible, which enables the release film 136 to take the same shape as the surface 132.

Figure 3E:
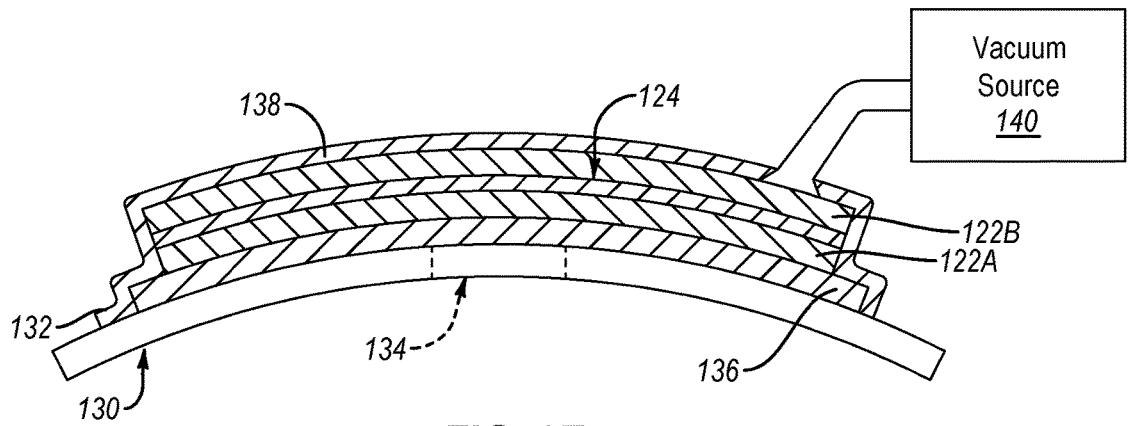

The method 200 additionally includes (block 210) applying pressure to the first metallic layer 122A, the curable bonding layer 124, and the second metallic layer 122B so that the first metallic layer 122A, the curable bonding layer 124, and the second metallic layer 122B are compressed against the surface 132. Referring to FIG. 3E, in one example, the pressure is applied to the layers via negative pressure created within a vacuum bag 138 sealed to the surface 132 over the layers. The vacuum bag 138 can be sealed to the surface 132 via any of various sealing techniques, such as tape, adhesive, etc. An interior cavity is defined between the vacuum bag 138 and the layers. The vacuum bag 138 includes an outlet that fluidically couples the interior cavity with a vacuum source 140, such as via a conduit or hose. When the vacuum source 140, which can include a vacuum device, is activated, the pressure within the interior cavity is reduced until the vacuum bag 138 applies a uniform pressure to the first metallic layer 122A, the curable bonding layer 124, and the second metallic layer 122B, which compresses the layers against the surface 132. Although the application of negative pressure is illustrated herein, in alternative examples, the pressure applied to the layers can be positive pressure, such as pressure applied via pressurized cylinders or actuators.

Figure 3F:
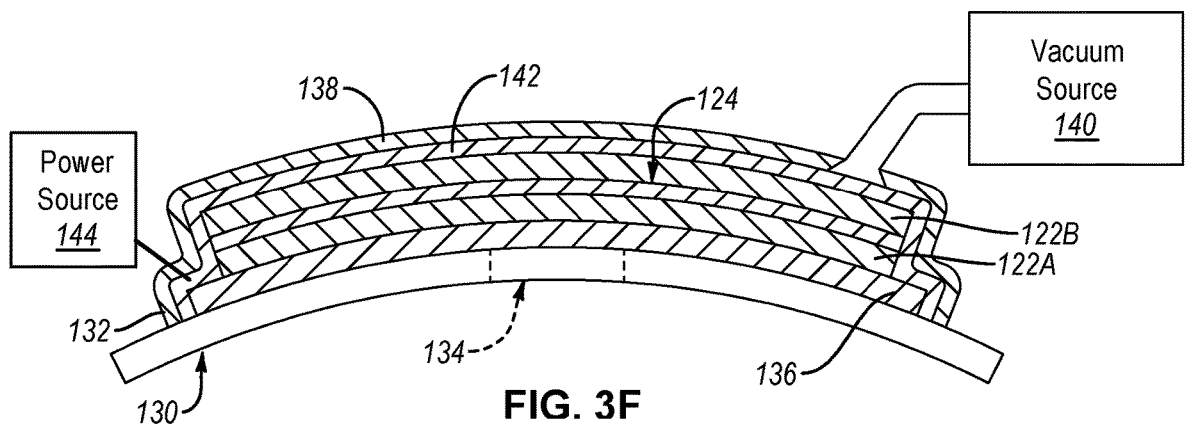

The method 200 further includes (block 212) curing the curable bonding layer 124 when pressure is applied to the curable bonding layer 124 (and the first metallic layer 122A and the second metallic layer 122B). In some examples, based on the type of curable material of the curable bonding layer 124, the curable bonding layer 124 is cured at room temperature. For example, the curable bonding layer 124 can be a liquid resin that is cured when left at room temperature for a predetermined period of time. However, in other examples, based on the type of curable material of the curable bonding layer 124, the curable bonding layer 124 is cured by heating the curable material. For example, the curable material can be a solid resin of a prepreg sheet that is cured when heated to a cure temperature of the solid resin for a predetermined period of time. Referring to FIG. 3F, in some examples where the curable material of the curable bonding layer 124 is cured by heating the curable material, the curable material is heated by applying a heating blanket 142 over the first metallic layer 122A, the curable bonding layer 124, and the second metallic layer 122B and activating the heating blanket 142 (by providing power from a power source 144) to generate heat. The heat from the heating blanket 142 is transmitted into the layers, including the curable bonding layer 124, to cure the curable bonding layer 124. As shown in FIG. 3F, in some examples, the vacuum bag 138 is applied over the heating blanket 142 after the heating blanket 142 is applied onto the first metallic layer 122A, the curable bonding layer 124, and the second metallic layer 122B. Accordingly, in such examples, the heating blanket 142 is located within the interior cavity defined by the vacuum bag 138 and is compressed, along with the layers, when the pressure within interior cavity is reduced.

Figure 3G:
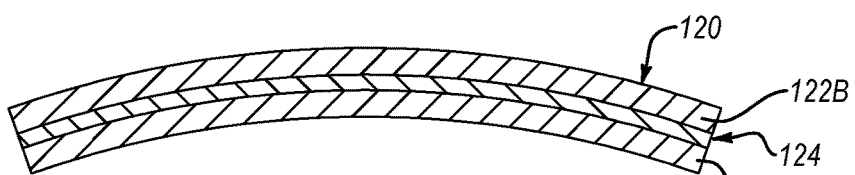

The method 200 also includes (block 214) removing the first metallic layer 122A, the curable bonding layer 124, and the second metallic layer 122B from the surface 132 after the curable bonding layer 124 is cured. After the curable bonding layer 124 is cured, the first metallic layer 122A, the curable bonding layer 124, and the second metallic layer 122B form the reinforcement part 120. Accordingly, removing the first metallic layer 122A, the curable bonding layer 124 (after being cured), and the second metallic layer 122B means removing the reinforcement part 120 from the surface 132. In other words, the reinforcement part 120 is formed in situ on the surface 132 of the part 130 of the vehicle before being removed from the surface 132. One example of the finished reinforcement part 120 is shown in FIG. 3G. It is recognized that removing the reinforcement part 120 from the surface 132 implies the reinforcement part 120 is removed from the release film 136. Subsequently, the release film 136 can be removed from the surface 132 as well and reused or discarded. Additional steps of the method can include trimming the reinforcement part 120 down to an appropriate size conducive to attachment back onto the surface 132 over the damage 134.

Figure 4:
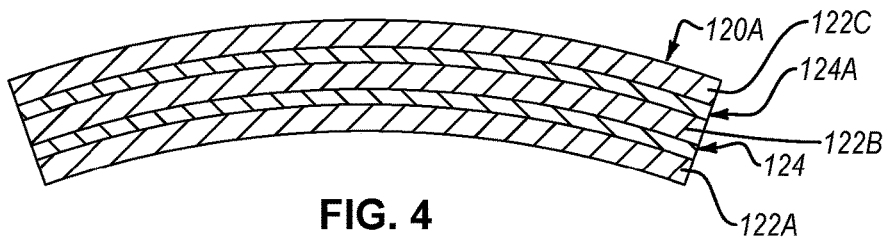
FIG. 4 is a cross-sectional side view of a reinforcement part, according to one or more examples of the present disclosure.
Figure 5:
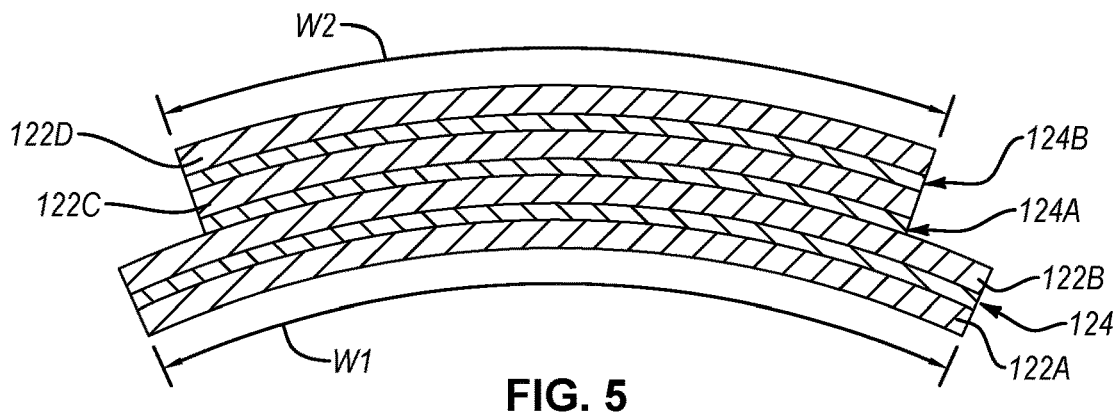
FIG. 5 is a cross-sectional side view of a reinforcement part, according to one or more examples of the present disclosure.

Although the reinforcement part 120 shown in FIG. 3G includes only two metallic layers and one curable bonding layer between the two metallic layers, in other examples, the reinforcement part 120 can include one or more additional curable bonding layers and metallic layers. In other words, the reinforcement part 120 can have any number of alternating metallic layers and curable bonding layers. For example, as shown in FIG. 4, a second reinforcement part 120A includes a second curable bonding layer 124A and a third metallic layer 122C, where the second curable bonding layer 124A is interposed between the second metallic layer 122B and the third metallic layer 122C. As another example, as shown in FIG. 5, a third reinforcement part 120B includes a third curable bonding layer 124B and a fourth metallic layer 122D, where the third curable bonding layer 124B is interposed between the third metallic layer 122C and the fourth metallic layer 122D. Moreover, the size and/or shape of one or more of the metallic layers and curable bonding layers can be different that of another one or more of the metallic layers and curable bonding layers. For example, a reinforcement part can be a repeating pattern of metallic layers and curable bonding layers where at least one of the metallic layers and at least one of the curable bonding layers have a smaller size relative to the layers underneath. For example, as shown in FIG. 5, the first metallic layer 122A, the curable bonding layer 124, and the second metallic layer 122B have a first width W1, and the second curable bonding layer 124A, the third metallic layer 122C, the third curable bonding layer 124B, and the fourth metallic layer 122D have a second width W2 that is less than the first width W1.

Figure 9A:
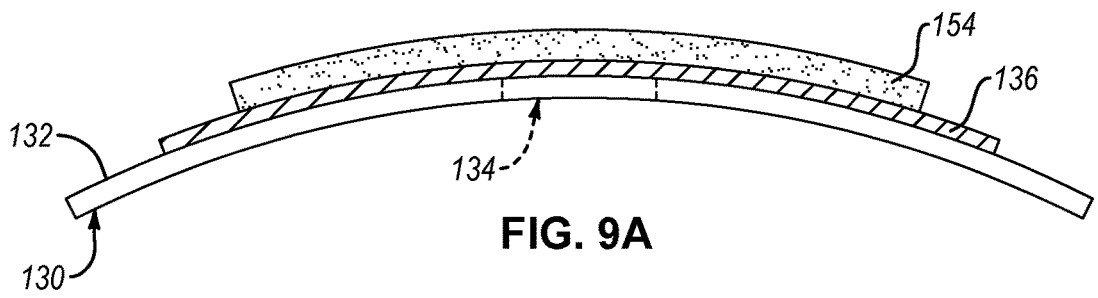
FIGS. 9A-9D are cross-sectional side views schematically illustrating respective steps of a method of making a reinforcement part, according to one or more examples of the present disclosure.
Figure 9B:
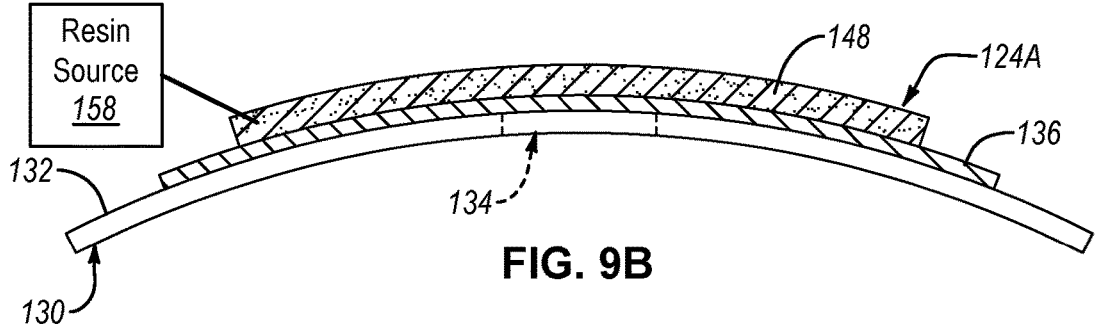

Referring to FIGS. 9A-9D, in some examples, the curable bonding layer 124 includes a dry fiber sheet 154 that is infused with liquid resin. In such examples, the step of applying the curable bonding layer 124 includes applying the dry fiber sheet 154 directly onto the first metallic layer 122A and infusing liquid resin into the dry fiber sheet 154 after it's applied onto the first metallic layer 122A. In certain examples, as shown in FIG. 9A, a base or second curable bonding layer 124A is applied directly onto the release film 136 and the first metallic layer 122A is applied directly onto the second curable bonding layer 124A, such that the first metallic layer 122A is applied indirectly onto the release film 136. The second curable bonding layer 124A can include a dry fiber sheet 154 that is infused with liquid resin and can be applied in the same manner as described above. The liquid resin is supplied from a resin source 158, which can be infused into the dry fiber sheet 154 manually or automatically.

Figure 9C:
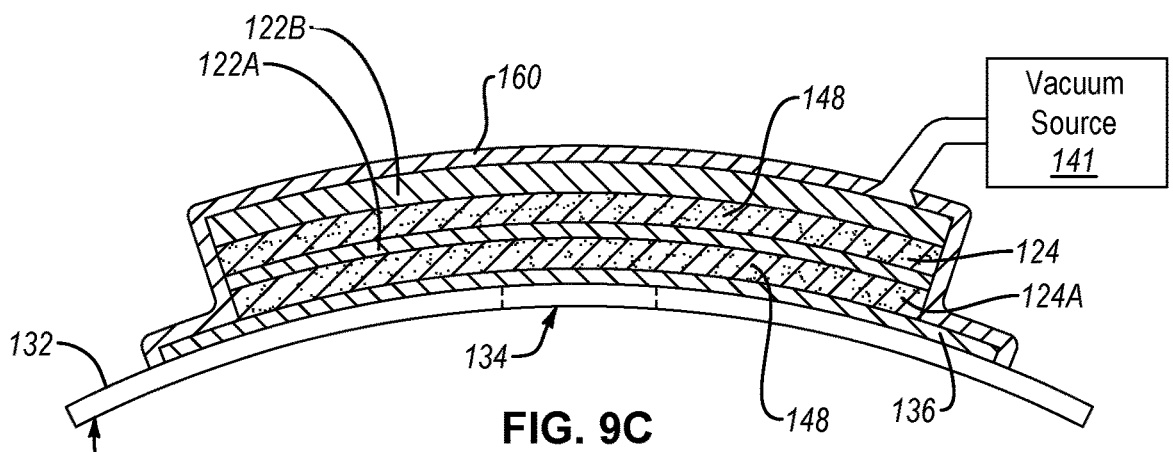

Referring to FIG. 9C, to promote uniform infusion of the resin throughout the dry fiber sheet 154, in some examples, the step of infusing the liquid resin includes applying a vacuum bag 160 over the first metallic layer 122A, the fiber-reinforced polymeric layer 148 (e.g., the liquid-resin infused dry fiber sheet), the second metallic layer 122B, and, optionally, the second curable bonding layer 124A, and sealing the vacuum bag 160 to the surface 132. When sealed, the vacuum bag 160 defines a cavity with the surface 132 that houses the first metallic layer 122A, the fiber-reinforced polymeric layer, the second metallic layer 122B, and, optionally, the base or second curable bonding layer 124A. The pressure within the cavity is reduced, such as via a second vacuum source 141, so that vacuum conditions are created within the cavity and the vacuum bag 160 applies a uniform pressure to the first metallic layer 122A, the fiber-reinforced polymeric layer 148, the second metallic layer 122B, and, optionally, the second curable bonding layer 124A. The uniform pressure helps to evenly distribute the resin within the dry fiber sheet 154 of the fiber-reinforced polymeric layer 148 and optionally the second curable bonding layer 124A.

Figure 9D:
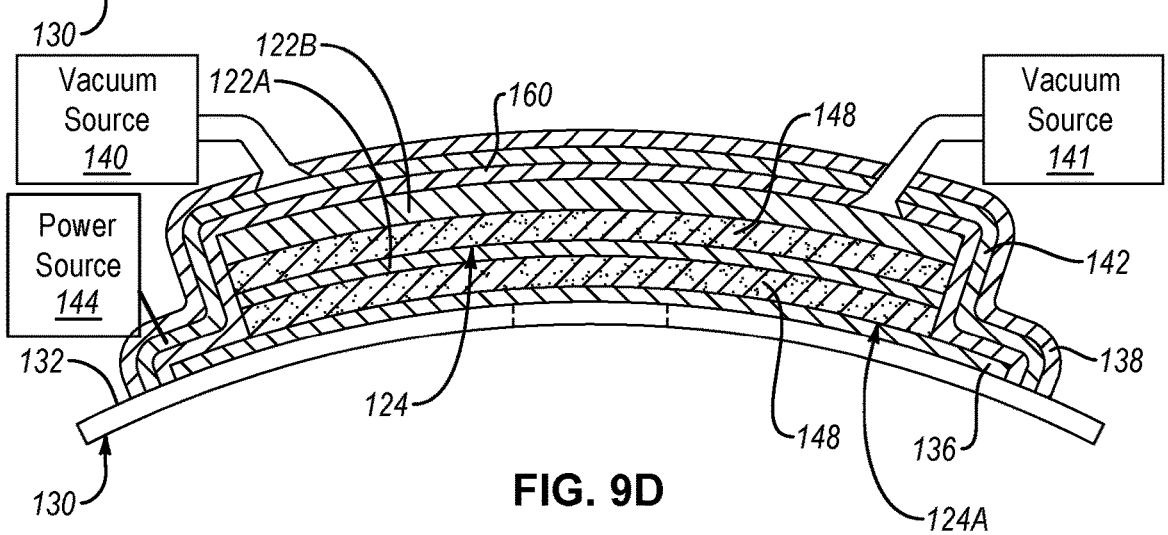

Referring to FIG. 9D, in some examples where the curable bonding layer 124 includes a dry fiber sheet 154 infused with liquid resin, the liquid resin is cured by heating the curable material with a heating blanket 142 applied over the vacuum bag 160. Additionally, another vacuum bag 138 is applied over the heating blanket 142, and thus over the vacuum bag 160. Accordingly, in such examples, the heating blanket 142 and the vacuum bag 160 is located within the interior cavity defined by the vacuum bag 138 and are compressed, along with the layers, when the pressure within interior cavity of the vacuum bag 138 is reduced. In this manner, a dual vacuum bag solution can be used to both infuse a dry fiber sheet with resin and to promote curing of the resin.

In certain examples where the curable bonding layer 124 includes a curable material that is curable at room temperature, the cure at room temperature is an initial cure and the method further includes an additional or final curing of the curable bonding layer 124 after the reinforcement part 120 is removed from the surface 132. The final curing of the curable bonding layer 124 can include raising the temperature of the curable bonding layer 124 to some predetermined temperature associated with an increased strength of the curable bonding layer 124.

Figure 11:
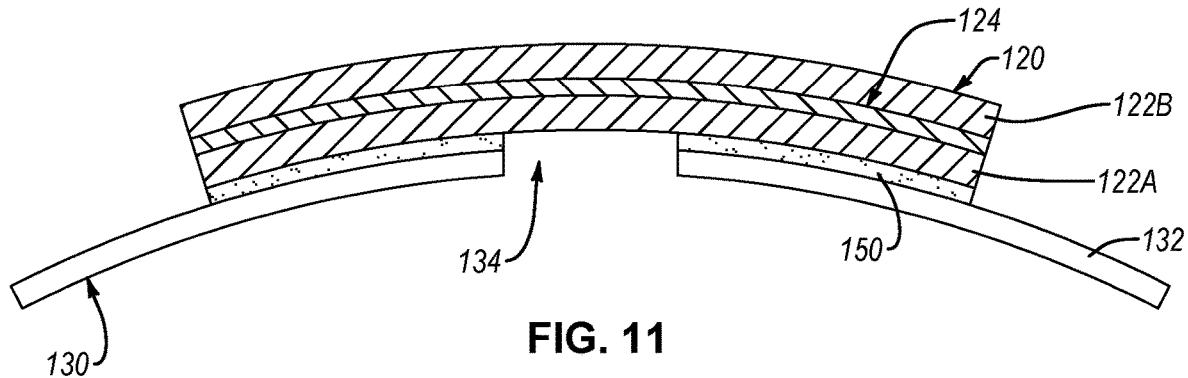
FIG. 11 is a cross-sectional side view of a reinforcement part attached to the surface of a vehicle using a first method, according to one or more examples of the present disclosure.
Figure 12:
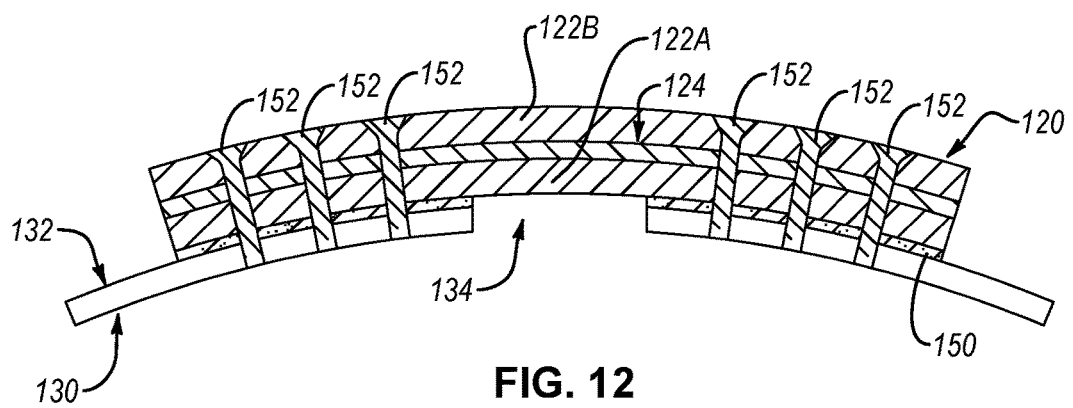
FIG. 12 is a cross-sectional side view of a reinforcement part attached to the surface of a vehicle using a second method, according to one or more examples of the present disclosure.
Figure 13:
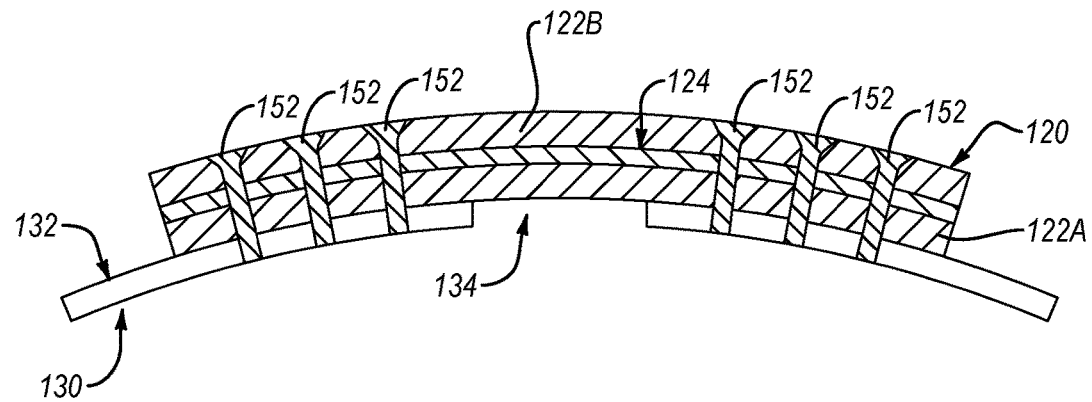
FIG. 13 is a cross-sectional side view of a reinforcement part attached to the surface of a vehicle using a third method, according to one or more examples of the present disclosure.
Figure 14:
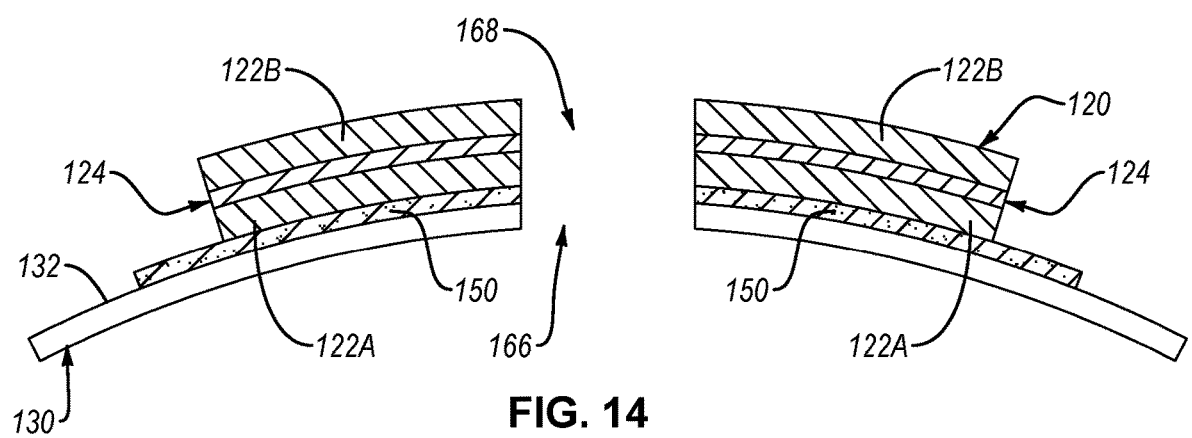
FIG. 14 is a cross-sectional side view of a reinforcement part attached to the surface of a vehicle using a fourth method, according to one or more examples of the present disclosure.

Referring again to FIG. 15, the method 200 additionally includes (block 216) attaching the reinforcement part 120 to the surface 132 after the reinforcement part 120 is removed from the surface 132 following formation of the reinforcement part 120 on the surface 132. Referring to FIGS. 11-13, in some examples, the reinforcement part 120 is attached to the surface 132 over (e.g., covering) the damage 134 to help reinforce (e.g., reduce propagation of the damage 134 to) the surface 132. However, in other examples, such as shown in FIG. 14, the reinforcement part 120 is attached to the surface 132 adjacent a feature 166 of (or damage to) the surface 132 to help reinforce the feature 166 by building up the gauge around the feature or damage. The feature 166 can be any of various features, such as a hole, a build-up around a hole, and the like. In such examples, the reinforcement part 120 can be formed with an opening 168 that corresponds with the feature 166, such that the feature 166 is accessible through the reinforcement part 120.

The reinforcement part 120 can be attached to the surface 132 of the part 130 in several ways. In a first example, shown in FIGS. 11 and 14, the reinforcement part 120 is secondarily bonded directly to the surface 132 with an adhesive 150 and without any fasteners. According to a second example, shown in FIG. 12, the reinforcement part 120 is secondarily bonded directly to the surface 132 with an adhesive 150 and the reinforcement part 120 is fastened to the surface 132, such as with bolts or fasteners 152. The fasteners 152 can help take on loads in the event the bond created by the adhesive 150 weakens or fails. In a third example, shown in FIG. 13, the reinforcement part 120 is fastened to the surface 132 without an adhesive.

As presented above, the reinforcement part 120 is formed on the surface 132, using the surface 132 as a tooling surface, removing the reinforcement part 120 from the surface 132, and subsequently attaching the reinforcement part 120 onto the surface 132. The location on or the portion of the surface 132 to which the reinforcement part 120 is attached is associated with a damaged portion of the surface 132 (i.e., a location on or the portion of the surface 132 that has the damage 134). In other words, the reinforcement part 120 is attached to a damaged portion of the surface 132 so that the reinforcement part 120 is either directly adjacent to (e.g., around) the damage 134 or is over (e.g., covering) the damage 134.

However, the portion of the surface 132 used as the tooling surface to form the reinforcement part 120 can be either the damaged portion or an undamaged portion of the surface 132 (i.e., a location on or the portion of the surface 132 that does not have damage, but does have a contour that is the same as the contour of the damaged portion of the surface 132). In one example, the reinforcement part 120 is formed on an undamaged portion of the surface 132 that shares similar contour characteristics as the damaged portion. For example, the undamaged portion can be a portion contiguous with the damaged portion or adjacent to the damaged portion (e.g., over, under, or to the side of the damaged portion. According to some implementations, the undamaged portion of the surface 132, on which the reinforcement part 120 is formed, is the portion of the surface 132 above or below the damaged portion at the same axial location along the body of the vehicle because the contour of the surface at the same axial location can be the same along an entire circumference of the vehicle. Because the contour characteristics of the undamaged portion and the damaged portion are similar or the same, the contour of the reinforcement part 120, when formed on the undamaged portion, promotes a mating engagement with the damaged portion when attached to the damaged portion.

According to another example, the reinforcement part 120 is formed on the damaged portion of the surface 132. In these examples, the reinforcement part 120 is removed from the damaged portion, to allow removal of the release film 136, and is then attached onto the same damaged portion. Forming the reinforcement part 120 on the same surface onto which the reinforcement part 120 will be attached ensures a mating engagement with the damage portion of the surface 132.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of making a reinforcement part for a vehicle, the method comprising:
   applying a release film directly onto a surface of the vehicle so that the release film conforms to a shape of the surface;
   applying a first metallic layer directly or indirectly onto the release film so that the first metallic layer conforms to the shape of the surface;

applying a curable bonding layer directly onto the first metallic layer so that the curable bonding layer conforms to the shape of the surface;

applying a second metallic layer directly onto the curable bonding layer so that the curable bonding layer is interposed between the first metallic layer and the second metallic layer, and so that the second metallic layer conforms to the shape of the surface;

applying pressure to the first metallic layer, the curable bonding layer, and the second metallic layer so that the first metallic layer, the curable bonding layer, and the second metallic layer are compressed against the surface;

curing the curable bonding layer when pressure is applied to the curable bonding layer to form the reinforcement part; and after curing the curable bonding layer, removing the reinforcement part from the surface.

2. The method according to claim 1, wherein the curable bonding layer comprises a fiber-reinforced polymeric layer.

3. The method according to claim 2, wherein:
the fiber-reinforced polymeric layer comprises a prepreg material; and
curing the curable bonding layer comprises heating the prepreg material.

4. The method according to claim 3, wherein heating the prepreg material comprises applying a heating blanket over the first metallic layer, the fiber-reinforced polymeric layer, and the second metallic layer and activating the heating blanket.

5. The method according to claim 2, wherein:
the curable bonding layer comprises a dry fiber sheet infused with liquid resin; and
applying the curable bonding layer comprises applying the dry fiber sheet directly onto the first metallic layer and infusing liquid resin into the dry fiber sheet when the dry fiber sheet is applied onto the first metallic layer.

6. The method according to claim 5, wherein the liquid resin is cured at room temperature.

7. The method according to claim 6, further comprising curing the fiber-reinforced polymer layer at a temperature greater than room temperature after the reinforcement part is removed from the surface.

8. The method according to claim 5, wherein infusing the liquid resin into the dry fiber sheet comprises:
applying a vacuum bag over the first metallic layer, the fiber-reinforced polymeric layer, and the second metallic layer;
sealing the vacuum bag to the surface so that the first metallic layer, the fiber-reinforced polymeric layer, and the second metallic layer are sealed within a cavity defined between the vacuum bag and the surface; and
reducing the pressure within the cavity.

9. The method according to claim 8, wherein:
curing the curable bonding layer comprises applying a heating blanket over the vacuum bag, the first metallic layer, the fiber-reinforced polymeric layer, and the second metallic layer; and
applying pressure to the first metallic layer, the fiber-reinforced polymeric layer, and the second metallic layer comprises:
applying a second vacuum bag over the heating blanket, the vacuum bag, the first metallic layer, the fiber-reinforced polymeric layer, and the second metallic layer;
sealing the second vacuum bag to the surface so that the heating blanket, the vacuum bag, the first metallic layer, the fiber-reinforced polymeric layer, and the second metallic layer are sealed within a second cavity defined between the second vacuum bag and the surface; and
reducing the pressure within the second cavity.

10. The method according to claim 1, wherein applying pressure to the first metallic layer, the curable bonding layer, and the second metallic layer comprises:
applying a vacuum bag over the first metallic layer, the curable bonding layer, and the second metallic layer;
sealing the vacuum bag to the surface so that the first metallic layer, the curable bonding layer, and the second metallic layer are sealed within a cavity defined between the vacuum bag and the surface; and
reducing the pressure within the cavity.

11. The method according to claim 1, wherein the curable bonding layer consists of a non-fibrous adhesive layer.

12. The method according to claim 1, wherein the curable bonding layer comprises:
a first non-fibrous adhesive layer;
a second non-fibrous adhesive layer; and
a fiber-reinforced polymeric layer interposed between the first non-fibrous adhesive layer and the second non-fibrous adhesive layer.

13. The method according to claim 1, wherein each one of the first metallic layer and the second metallic layer has a thickness between, and inclusive of, 0.01 inches and 0.04 inches.

14. The method according to claim 1, wherein the shape of the surface, to which the release film, the first metallic layer, the curable bonding layer, and the second metallic layer is conformed, is non-planar.

15. The method according to claim 1, wherein:
the vehicle is an aircraft; and
the surface is an exterior surface of a skin of the aircraft.

16. The method according to claim 1, wherein one of:
the first metallic layer is applied directly onto the release film; or
the method further comprises applying a second curable bonding layer directly onto the release film so that the second curable bonding layer conforms to the shape of the surface, and the first metallic layer is applied directly onto the second curable bonding layer.

17. A method of reinforcing a vehicle, the method comprising:
applying a release film directly onto a surface of the vehicle so that the release film conforms to a shape of the surface;
applying a first metallic layer directly or indirectly onto the release film so that the first metallic layer conforms to the shape of the surface;
applying a curable bonding layer directly onto the first metallic layer so that the curable bonding layer conforms to the shape of the surface;
applying a second metallic layer directly onto the curable bonding layer so that the curable bonding layer is interposed between the first metallic layer and the second metallic layer, and so that the second metallic layer conforms to the shape of the surface;
applying pressure to the first metallic layer, the curable bonding layer, and the second metallic layer so that the first metallic layer, the curable bonding layer, and the second metallic layer are compressed against the surface;

curing the curable bonding layer when pressure is applied to the curable bonding layer to form a reinforcement part comprising the first metallic layer, the curable bonding layer, and the second metallic layer;

after curing the curable bonding layer, removing the reinforcement part from the surface and removing the release film from the surface; and after removing the reinforcement part and the release film from the surface, attaching the reinforcement part to the surface.

18. The method according to claim 17, wherein:

the release film is applied directly onto a first portion of the surface over damage to or adjacent a feature of the first portion of the surface;

the first metallic layer, the curable bonding layer, and the second metallic layer conform to the shape of the first portion of the surface; and the reinforcement part is attached to the first portion of the surface over the damage to or adjacent the feature of the first portion of the surface.

19. The method according to claim 17, wherein:

the release film is applied directly onto a first portion of the surface;

the first metallic layer, the curable bonding layer, and the second metallic layer conform to the shape of the first portion of the surface;

the reinforcement part is attached to a second portion of the surface over damage to or adjacent a feature of a second portion of the surface that is spaced from the first portion of the surface; and the first portion of the surface has a contour that matches a contour of the second portion of the surface.

20. The method according to claim 17, wherein attaching the reinforcement part to the surface comprises bonding the reinforcement part to the surface.

21. The method according to claim 20, wherein attaching the reinforcement part to the surface further comprises bolting the reinforcement part to the surface.

22. The method according to claim 17, wherein attaching the reinforcement part to the surface comprises bolting the reinforcement part to the surface.

* * * * *